United States Patent
Bang (10) Patent No.: US 7,787,073 B2
(45) Date of Patent: Aug. 31, 2010

(54) BACKLIGHT UNIT WITH A PLURALITY OF LAMPS EACH INCLUDING AN LED CHIP WITH A PROTECTING LENS THEREFOR AND A SEMI-TRANSPARENT MATERIAL AND REFLECTING SUBSTANCE ON THE UPPER PART OF THE LENS

(75) Inventor: Ju Young Bang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 647 days.

(21) Appl. No.: 11/318,642

(22) Filed: Dec. 28, 2005

(65) Prior Publication Data

US 2006/0203146 A1    Sep. 14, 2006

(30) Foreign Application Priority Data

Feb. 28, 2005    (KR) ............... 10-2005-0017029

(51) Int. Cl.
    *G02F 1/1335* (2006.01)
(52) U.S. Cl. .................... 349/62; 349/61; 349/67
(58) Field of Classification Search ............ 349/67, 349/58–64; 362/307, 308, 310, 327, 545, 362/555
    See application file for complete search history.

(56) References Cited

U.S. PATENT DOCUMENTS

| | | | |
|---|---|---|---|
| 6,598,998 B2 * | 7/2003 | West et al. ............... | 362/307 |
| 7,239,792 B2 * | 7/2007 | Kim ............... | 385/125 |
| 2002/0097578 A1 * | 7/2002 | Greiner ............... | 362/240 |
| 2002/0159002 A1 * | 10/2002 | Chang ............... | 349/61 |
| 2004/0046222 A1 * | 3/2004 | Nagai et al. ............... | 257/433 |
| 2004/0233665 A1 | 11/2004 | West et al. | |
| 2005/0001537 A1 | 1/2005 | West et al. | |
| 2005/0007516 A1 * | 1/2005 | Hong et al. ............... | 349/64 |
| 2005/0030444 A1 * | 2/2005 | Fujiwara et al. ............... | 349/64 |
| 2006/0119250 A1 | 6/2006 | Suehiro et al. | |

FOREIGN PATENT DOCUMENTS

| | | |
|---|---|---|
| JP | 2004-128434 | 4/2004 |
| JP | 2004-233828 | 8/2004 |
| JP | 2004-311353 | 11/2004 |
| JP | 2004-349251 | 12/2004 |
| KR | 2003-0097143 | 12/2003 |

* cited by examiner

*Primary Examiner*—John Heyman
(74) *Attorney, Agent, or Firm*—Morgan, Lewis & Bockius LLP

(57) ABSTRACT

A backlight unit includes a plurality of lamp array units, each having a plurality of LED lamps evenly arranged in one direction, a reflecting substance formed on an upper surface of each of the LED lamps to reflect light emitted from the corresponding LED lamp in a lateral direction, a light dispersion member provided over the lamp array units, and an outer case supporting the light dispersion member.

7 Claims, 8 Drawing Sheets

BACKLIGHT UNIT WITH A PLURALITY OF LAMPS EACH INCLUDING AN LED CHIP WITH A PROTECTING LENS THEREFOR AND A SEMI-TRANSPARENT MATERIAL AND REFLECTING SUBSTANCE ON THE UPPER PART OF THE LENS

This application claims the benefit of the Korean Patent Application No. P2005-0017029, filed in Korea on Feb. 28, 2005, which is hereby incorporated by reference.

BACKGROUND OF THE INVENTION

1. Field of the Invention

The present invention relates to a liquid crystal display (LCD) device, and more particularly, to a backlight unit and LCD device using the same. Although the present invention is suitable for a wide scope of applications, it is particularly suitable for improving uniformity and color mixture of the backlight.

2. Discussion of the Related Art

Generally, a cathode ray tube (CRT) is mainly used as one of various display devices, such as a monitor of a television (TV), measuring instrument, information terminal or the like. However, the CRT cannot meet the demand for an electronic product having a reduced size and weight. For this reason, many flat display devices, such as an LCD using electric-field optical effect, a plasma display panel (PDP) using gas discharge, and an electroluminescent display (ELD) using electroluminescence, were developed to substitute in place of the CRT. Among those flat display devices, the LCD has attracted considerable attention because of its small size, light weight, and low power consumption. Hence, there has been a great demand for the LCD to be utilized as a laptop computer monitor, a desktop computer monitor, and a large-scale information display.

The LCD device is a light-receiving device that displays images by adjusting a quantity of a light source. The light source is a separate entity that may be a backlight for applying light to an LCD panel. The backlight may be either an edge type or a direct type depending on an installation location of a lamp unit of the backlight. Currently, there are various types of light sources such as EL (electroluminescence), LED (light emitting diode), CCFL (cold cathode fluorescent lamp), and HCFL (hot cathode fluorescent lamp) that can be used as the light source. In particular, the CCFL has been widely utilized for a large-scale color TFT-LCD because of its thin profile, long endurance and low power consumption.

The CCFL includes a fluorescent discharge tube in which Hg gas with Ar, Ne and the like is sealed to utilize a penning effect. Electrodes are provided at both ends of the tube. A negative electrode is formed flat to have a wide area. In case of voltage impression, electric charged particles within the discharge tube collide with the flat negative electrode to generate secondary electrons like sputtering. The generated secondary electrons excite neighbor elements to generate plasma. The excited elements discharge strong UV-rays that excite a fluorescent substance to radiate a visible ray.

In the edge type backlight, a lamp unit is provided to a lateral side of a light-guiding panel. The lamp unit includes a lamp emitting light, a lamp holder mounted in both ends of the lamp to protect the lamp, and a lamp reflector having one side fitted in the lateral side of the light-guiding panel to reflect the light emitted from the lamp toward the light-guiding panel. Such an edge type backlight is applied to a small-scale LCD device as a monitor of a laptop or desktop computer. The LCD device utilizing the edge type backlight is advantageous in light uniformity, long endurance and slim size.

In the direct type backlight, a plurality of lamps are arranged in a row to directly illuminate a front side of an LCD panel. The direct type backlight has a higher light efficiency than that of the edge type backlight and is mainly applied to a large-scale LCD (over 20 inches) requiring high luminance. An LCD with the direct type backlight is utilized as a large-scale monitor or television to be driven longer than a laptop computer, and includes more lamps. Hence, it is possible that some of the lamps in the direct type backlight are not lighted due to the failure or long-term use endurance of the lamps. As a result, a part failing in lighting the corresponding lamp becomes remarkably darker than the normal part to be directly recognized on the screen. Accordingly, the direct type backlight requires frequent replacements for lamps and needs to have a configuration facilitating assembly/disassembly of the backlight unit.

As noted above, the LCD adjusts the light quantity transmitted via the screen using liquid crystals and determines the color and brightness using the adjusted light. Hence, the LCD device is different from those of general display devices in the following aspects. For instance, the LCD device provides a viewing angle with considerably varying image quality according to an angle for viewing a screen, a transmittance according to a projective type light emitting display, a color reproducibility of how much a transmitted light passing through a color filter can reproduce R, G and B colors, a luminance indicating brightness of a picture, and an after image resulting from an image of long-term retention.

The LCD expands its field to a desktop PC monitor and a home TV from a display of a portable product. Despite its physical advantages of lightweight, flatness, smallness and shortness, the LCD is less advantageous than the CRT in color reproducibility, luminance and the like. A conventional notebook monitor LCD has color reproducibility 40~50% lower than a color TV according to a system adopted by NTSC (National Television System Committee). However, it can meet the user's demand with its color reproducibility only. Thus, the LCD market demands the development of an LCD that can implement color reproducibility exceeding that of the CRT for use in a TV.

A general multi-color LCD, which includes a liquid crystal panel, a backlight and a color filter, implements various colors by separating a white light projected from the backlight having a 3-wavelength fluorescent lamp into three colors of R, G and B and by adding and mixing the three colors. When blue, green and red LEDs are simultaneously used in implementing a white color, many problems take place in its application. In particular, its application is substantially difficult due to the technical difficulty of producing the white color by collecting different colors coming from locations of the respective LEDs. Hence, to implement the white color, one LED can emit three wavelengths having predetermined intensity at least. Thus, there has been a strong desire to develop a backlight that can provide the advantages of a small SMD (surface mounting device) LED of a mobile phone having very low power consumption as well as the advantages of the CCFL of a notebook computer having excellent color reproducibility.

Figure 1:
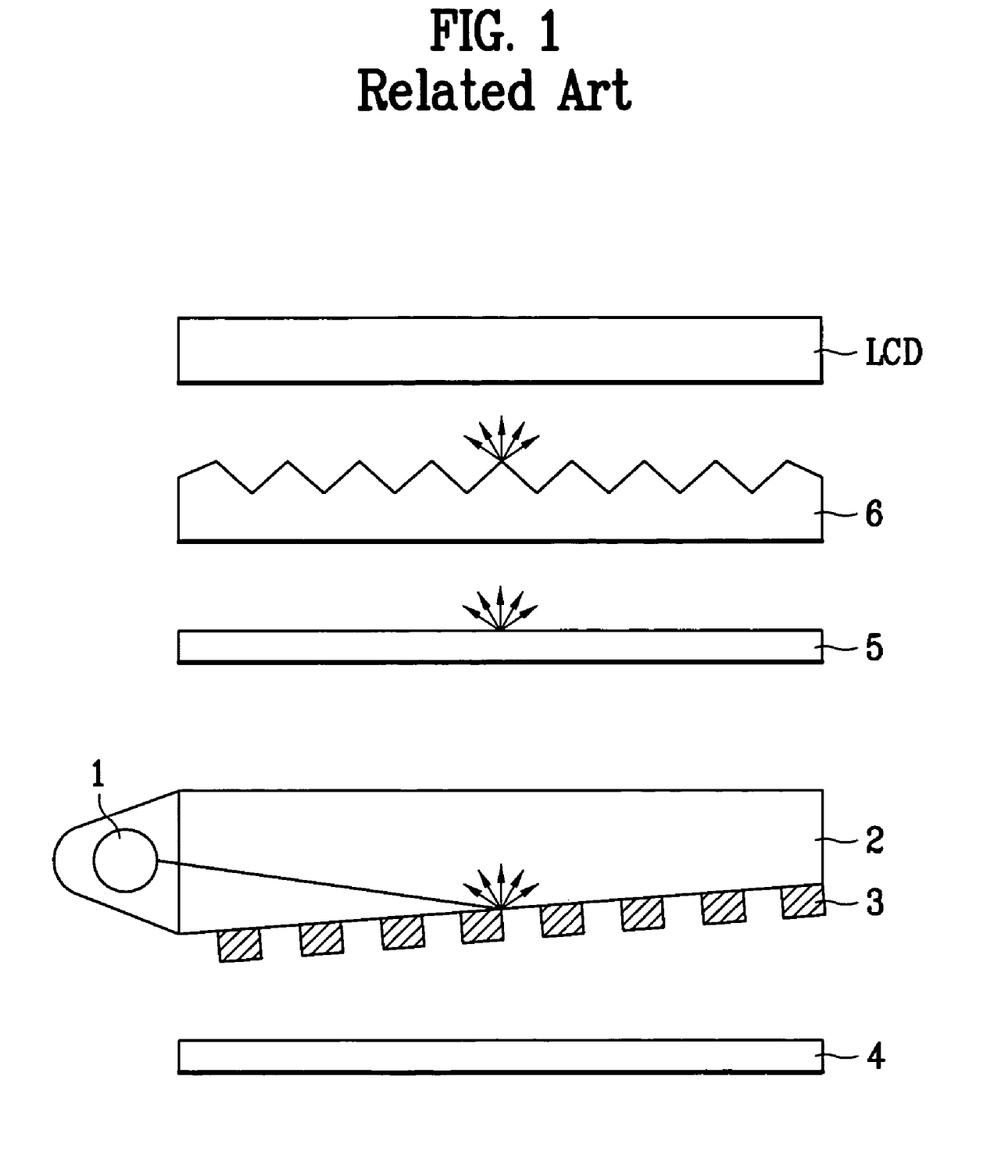
FIG. 1 is a schematic cross-sectional view illustrating a backlight unit according to the related art.

A backlight according to the related art is explained with reference to FIG. 1. FIG. 1 is a cross-sectional view illustrating a backlight unit according to the related art. As shown in FIG. 1, the backlight unit is provided with a fluorescent lamp 1, a light-guiding panel 2, a diffusion substance 3, a reflector sheet 4, a diffuser sheet 5 and a prism sheet 6. When a voltage is applied to the fluorescent lamp 1, remaining electrons existing in the fluorescent lamp 1 migrate into a positive electrode. The migrating electrons collide with Ar. The Ar is excited to increase positive ions. The increased positive ions then collide with a negative electrode to generate secondary electrons. When the generated secondary electrons flow within a tube to initiate electric discharge, a flow of electrons by the electric discharge collide to ionize with Hg vapor to emit UV and visible rays. The emitted UV rays excite a fluorescent substance coated on an inner wall of the fluorescent lamp 1 to emit light of visible ray.

The light-guiding panel 2 is a wave-guide that projects a surface light source by introducing the light emitted from the fluorescent lamp 1 inside. The light-guiding panel 2 is formed of PMMA (polymethyl methacrylate) resin having good light transmittance. Factors relating to incident light efficiency of the light-guiding panel 2 include light-guiding panel thickness to lamp diameter, distance between the light-guiding panel 2 and the lamp 1, and a lamp reflector shape. The incident light efficiency is raised by laying the fluorescent lamp 1 aslant in a thickness direction deviating from a center of the light-guiding panel 2. The light-guiding panel 2 of the LCD backlight may be one of a print type light-guiding panel, a V-cut type light-guiding panel, and a dispersion light-guiding panel.

The diffusion substance 3 includes $SiO_2$ particles, PMMA, solvent and the like. The $SiO_2$ particles are used for light diffusion and have a porous structure. The PMMA is used in attaching the SiO2 particles to a lower surface of the light-guiding panel 2. The diffusion substance 3 is coated on a lower surface of the light-guiding panel 2 in a dot form. A dot area is increased step by step to obtain a uniform surface light source on an upper part of the light-guiding panel 2. That is, an area rate per unit area occupied by the dot close to the fluorescent lamp 1 is small, whereas an area rate per unit area occupied by the dot distant from the fluorescent lamp 1 is large. Moreover, the dot may have various shapes. If the area rate per unit area is equal, the effect of the same brightness can be obtained from the upper part of the light-guiding panel 2.

The reflector sheet 4 is provided to a rear end of the light-guiding panel 2 to enable the light projected from the fluorescent lamp 1 to enter an inside of the light-guiding panel 2. The diffuser sheet 5 is provided over the light-guiding panel 2 and has a dot pattern coated thereon to provide uniform luminance according to a viewing angle. The diffuser sheet 5 is formed of PET or PC (polycarbonate) resin. A particle coating layer is provided on an upper part of the diffuser sheet 5 to play a role in diffusion. The prism sheet 6 serves to enhance front luminance of light that is transmitted through the upper part of the diffuser sheet 5 to be reflected. The prism sheet 6 enables a specific-angle light to transmit. The rest-angle incident light returns to a lower part of the prism sheet 6 due to total internal reflection. The returning light is reflected by the reflector sheet 4 attached to the lower part of the light-guiding panel 2.

The backlight unit of FIG. 1 is fixed to a mold frame. A display unit provided to an upper surface of the backlight unit is protected by a top chassis. The top chassis and the mold frame are assembled together to accommodate the backlight unit and display units in-between.

Figure 2:
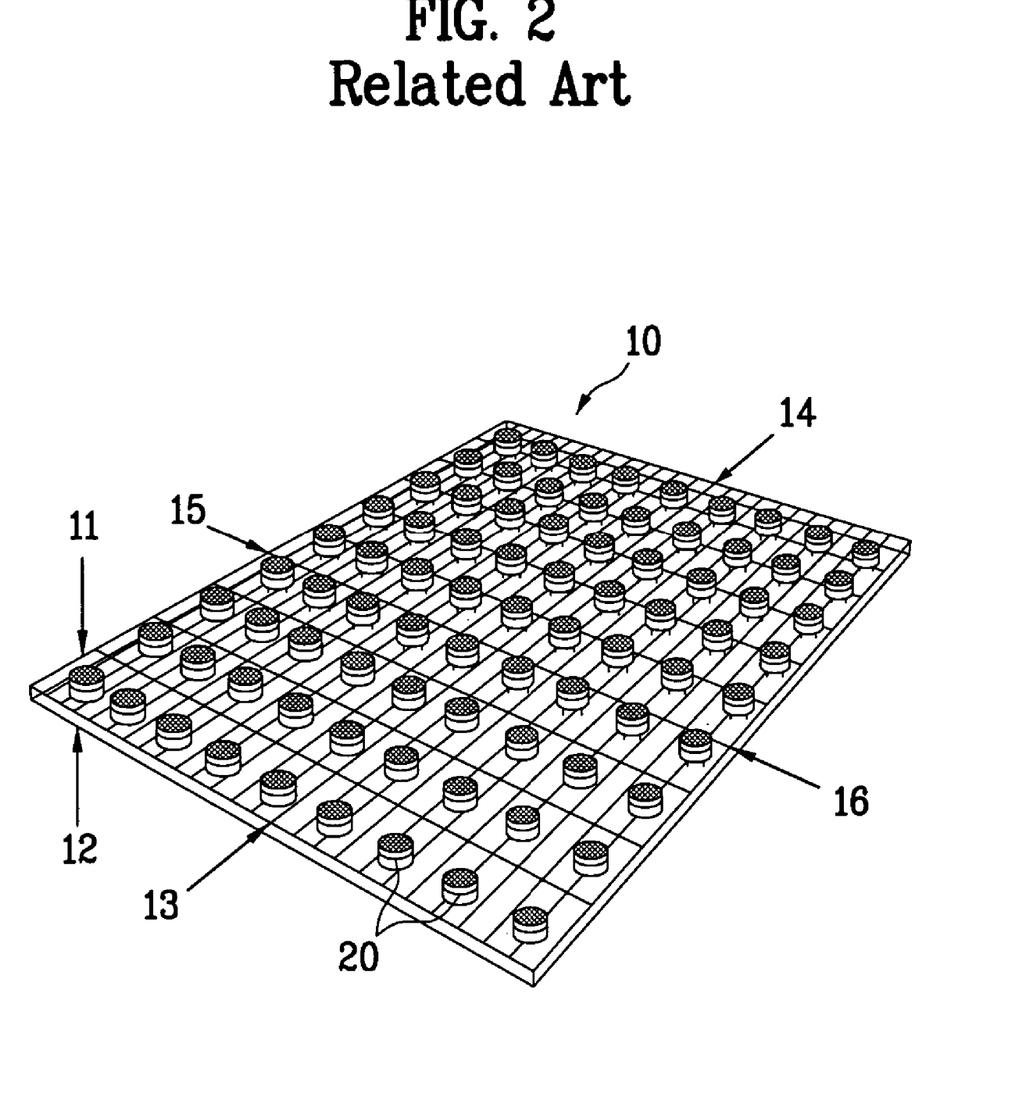
FIG. 2 is a schematic perspective view illustrating an optical wave guide tube plate of a backlight unit according to the related art.
Figure 3:
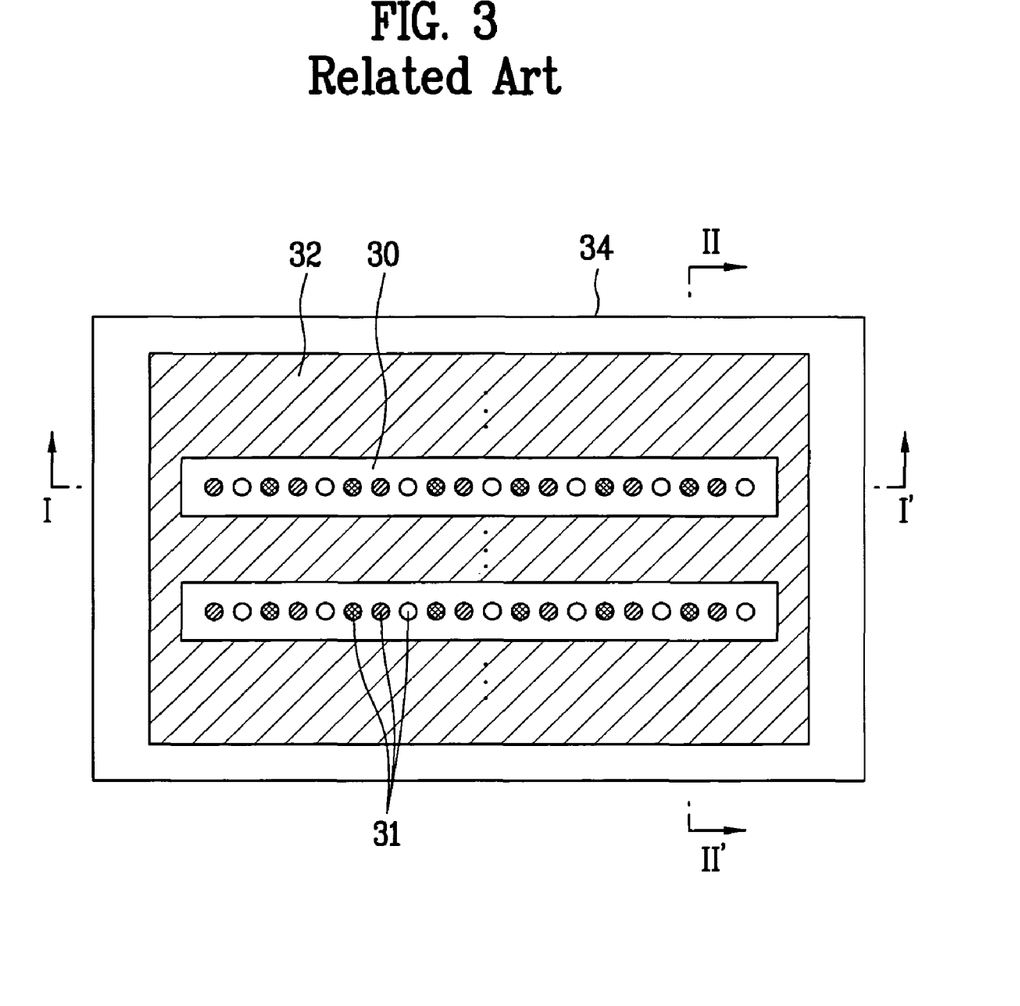
FIG. 3 is a layout view schematically illustrating another backlight unit according to the related art.
Figure 4A:
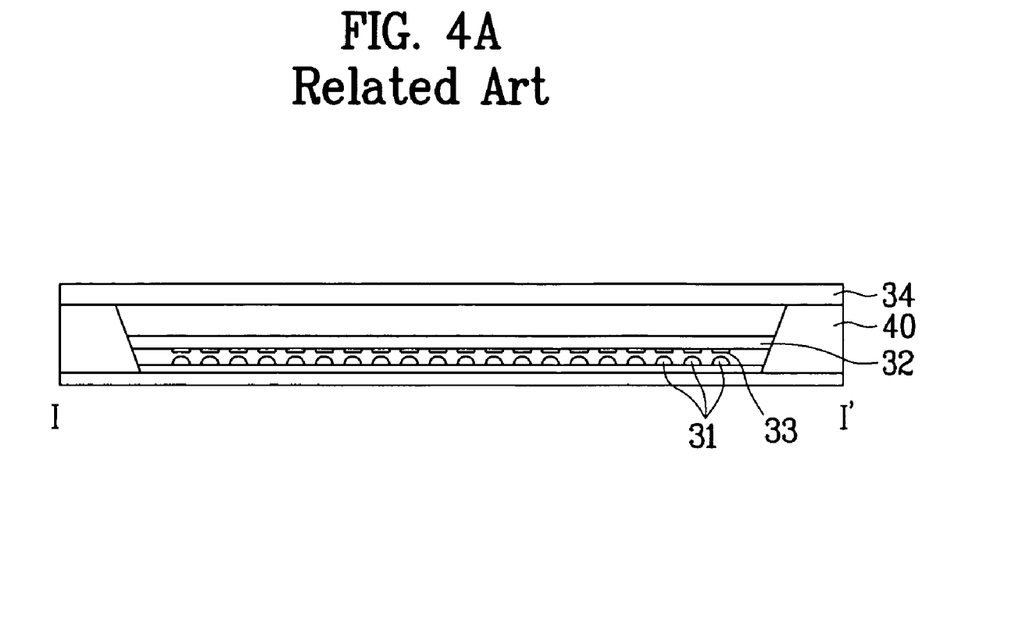
FIG. 4A and FIG. 4B are schematic cross-sectional view illustrating the backlight unit of FIG. 3 taken along cutting lines I-I' and II-II', respectively.
Figure 4B:
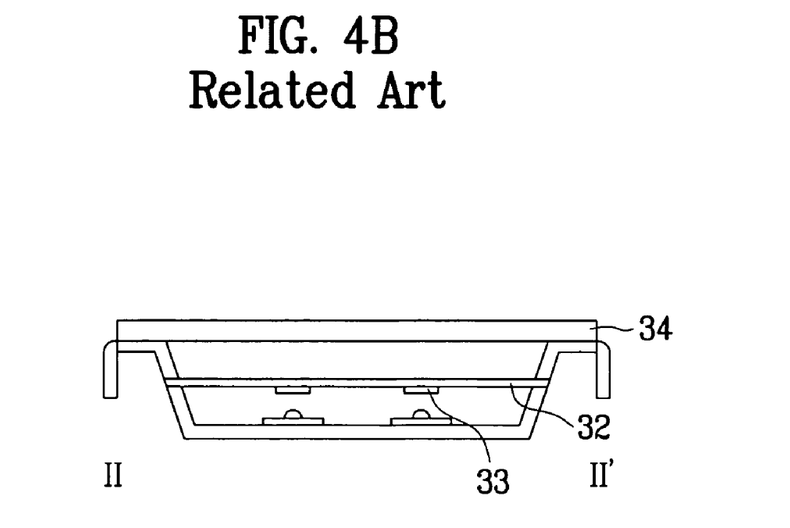

Other backlight units according to the related art are explained with reference to drawings. FIG. 2 is a perspective view illustrating an optical wave guide tube plate of a backlight unit according to the related art. FIG. 3 is a layout view illustrating another backlight unit according to the related art. FIG. 4A and FIG. 4B are cross-sectional views illustrating the backlight unit of FIG. 3 taken along lines I-I' and II-II', respectively.

As shown in FIG. 2, a rectangular optical wave guide tube plate 10 of the related art backlight unit is formed of a transparent substance. The optical wave guide tube plate 10 includes a light discharging surface 11 at a couple-out upper lateral side, a lower lateral side 12 provide to an opposite side to the light discharging surface 11 and four lateral sides 13 to 16. A plurality of cavities 20 for a light source are indented to the lower lateral side 12 of the optical wave guide tube plate 10 to extend in a direction of the light discharge surface 11. R/G/B LED lamps (not shown) are provided under the plurality of cavities 20, respectively. Preferably, the plurality of cavities 20 are evenly distributed on the optical wave guide tube plate 10 in a regular grid arrangement.

The thus-configured backlight unit using the R/G/B LED lamps is advantageous in improving color reproducibility not using Hg. To mix and discharge colors coming from the R/G/B LED lamps, each of the cavities needs to be provided with an upper lateral side and a lateral sidewall to correspond to the light discharge surface 11. The upper lateral side should be coated with a first reflecting layer and a lower lateral side of each of the cavities should be coated with a second reflecting layer. An edge of each of the cavities 20 should be enclosed by a third reflecting layer. Moreover, it needs to be complicatedly configured to bring about coupling of the LED lamp light between the optical light guide tube plate 10 and each of the cavities 20 through the lateral sidewall.

The backlight unit of FIG. 3 is provided with a direct type intermediate light-guiding panel. As shown in FIG. 4A and FIG. 4B, the related art backlight includes a plurality of lamp array units 30 (see FIG. 3), each having a plurality of LED lamps 31 arranged in one direction, a light dispersion member 34 arranged over the lamp array units 30 for diffusing light to transfer to an LCD panel, an intermediate light-guiding panel 32 provided between the LED lamps 31 and the light dispersion member 34, a plurality of reflector sheets 33 provided beneath the intermediate light-guiding panel 32 to oppose the LED lamps 31, respectively, and an outer case 40 having the LED lamps 31 fixed thereto to support the intermediate light-guiding panel 32 and the light dispersion member 34.

In the related art backlight unit, the transparent intermediate light-guiding panel 32, which has the reflector sheets 33 attached to its bottom to confront the LED lamps 31, respectively, is provided in the vicinity of the LED lamps 31, so that R/G/B colors emitted from the LED lamps 31 can be well mixed. Moreover, by the reflector sheets 33 provided beneath the intermediate light-guiding panel 32 to confront the LED lamps 31, the strong lights emitted from the LED lamps 31 are prevented from directly coming to the LCD panel, respectively.

However, in the related art LCD backlight unit, the intermediate light-guiding panel 32 may be hung down in a direction of the LED lamps 31 by heat, vibration, shock or the like to alter the backlight unit or to break the LED lamps 31, thereby degrading color uniformity and color mixture rate. To solve the problem, the intermediate light-guiding panel 32 and the reflector sheets 33 may be removed. However, if they are removed, the light coming from the upper part of the LED lamps 31 directly propagate to the diffuser sheet to fail in being mixed together, thereby degrading the light uniformity.

SUMMARY OF THE INVENTION

Accordingly, the present invention is directed to a backlight unit and LCD device using the same that substantially obviate one or more problems due to limitations and disadvantages of the related art.

An object of the present invention is to provide a backlight unit and LCD device using the same that can achieve a simple structure without employing the intermediate light guide panel of the related art.

Another object of the present invention is to provide a backlight unit and LCD device using the same that can prevent the LED lamp from being broken or deformed forming the reflecting substance on each LED lamp.

Still another object of the present invention is to provide a backlight unit and LCD device using the same that can improve color uniformity and color mixture by reflecting light emitted from the LED lamps in the lateral directions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight unit according to the present invention includes a plurality of lamp array units, each including a plurality of lamps evenly arranged in one direction, a reflecting substance formed on an upper surface of each of the LED lamps to reflect light emitted from the corresponding LED lamp in a lateral direction, a light dispersion member provided over the lamp array units, and an outer case supporting the light dispersion member.

In another aspect of the present invention, an LCD device includes a plurality of LED lamps sequentially and evenly arranged, a first reflecting substance formed on an upper surface of each of the lamps to reflect the light emitted from the each of the plurality of lamps in a lateral direction, a light dispersion member provided over the LED lamps for diffusing to project the light reflected by the reflecting substance, an outer case fixing the LED lamps thereto and supporting the light dispersion member, an LCD panel provided onto the light dispersion member to display an image by receiving the light projected from the light dispersion member, and a top case provided to edges of the LCD panel and lateral sides of the outer case to fix the LCD panel and the outer case thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 5:
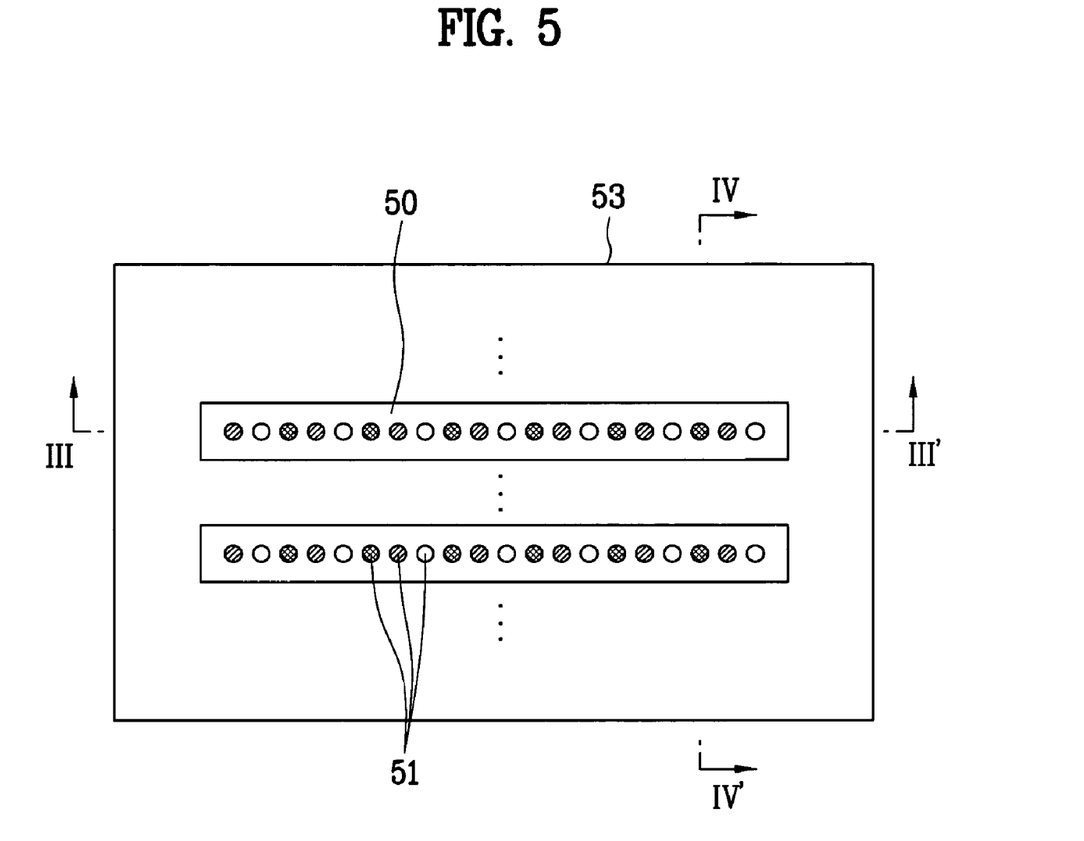
FIG. 5 is a layout view schematically illustrating a backlight unit according to one exemplary embodiment of the present invention.
Figure 6A:
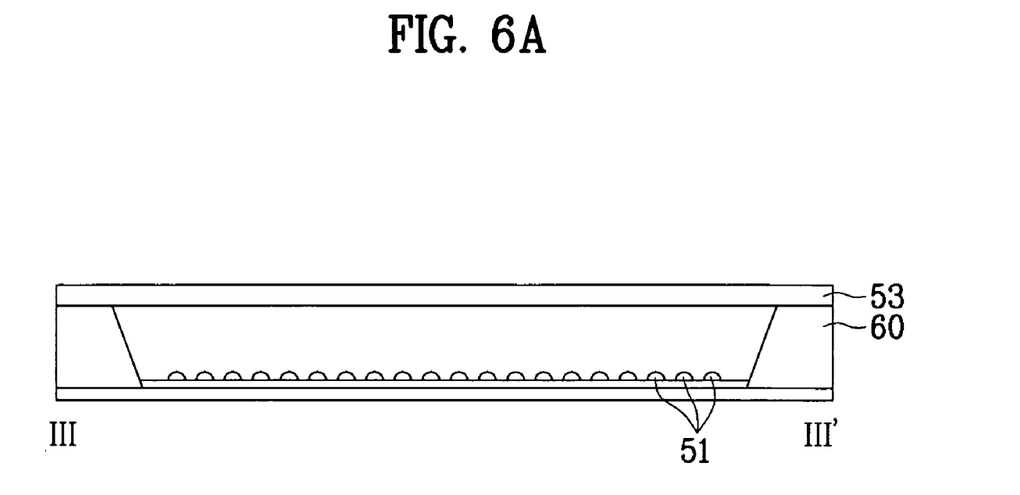
FIG. 6A and FIG. 6B are cross-sectional views schematically illustrating the backlight unit taken along cutting lines III-III' and IV-IV' of FIG. 5.
Figure 6B:
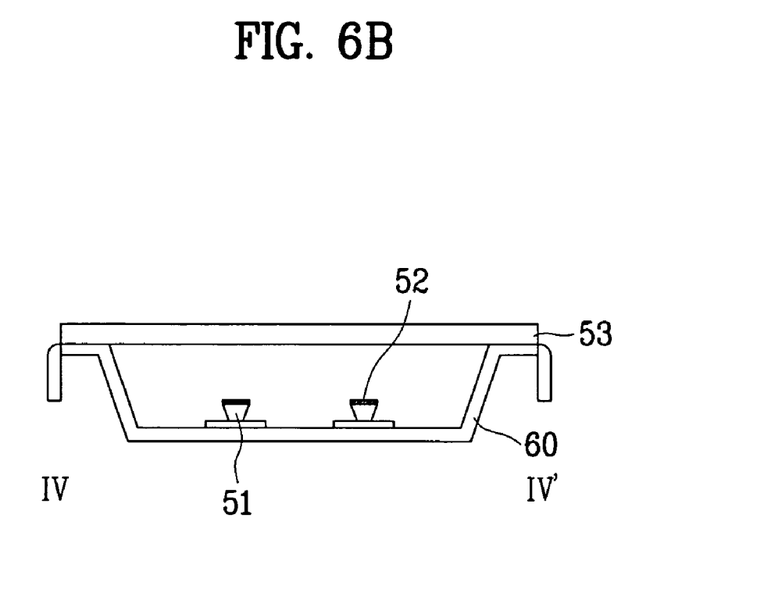

FIG. 5 is a layout view schematically illustrating a backlight unit according to one exemplary embodiment of the present invention, and FIG. 6A and FIG. 6B are cross-sectional views schematically illustrating the backlight unit taken along cutting lines III-III' and IV-IV' of FIG. 5. As showing in FIG. 5, FIG. 6A and FIG. 6B, a direct type LED backlight unit includes a plurality of lamp array units 50, each having a plurality of R/G/B LED lamps 51 sequentially arranged in one direction, a reflecting substance 52 formed on an upper surface of each of the LED lamps 51 to reflect light in a lateral direction, a light dispersion member 53 provided over the lamp array units 50 for diffusing to transfer the light emitted from the LED lamps 51, and an outer case 60 fixing the LED lamps 51 thereto to support the light dispersion member 53.

The light dispersion member 53 serves to prevent images of the LED lamps 51 from appearing on a display screen of an LCD panel and to provide a light source having uniform brightness distribution overall. The light dispersion member 53 includes a plurality of diffusion sheets and diffusion plates provided between the LCD panel and the light dispersion member 53 to improve the light dispersion effect.

A reflecting substance (not shown in the drawings) is formed on an inner surface of the outer case 60 to reflect the light reflected by the reflecting substances 52 formed on the LED lamps 51 toward the light dispersion member 53. The reflecting substance 52 formed on each of the LED lamps 51 may be formed of a white material of diffused reflection, mirror reflection, metal reflection or the like. In the backlight unit according to this exemplary embodiment, the reflecting substance 52 is formed on each of the LED lamps 51 so that the light emitted from the corresponding LED lamp 51 is reflected by the reflecting substance 52 to diffuse in a lateral direction, thereby improving uniformity and color mixture.

Figure 7:
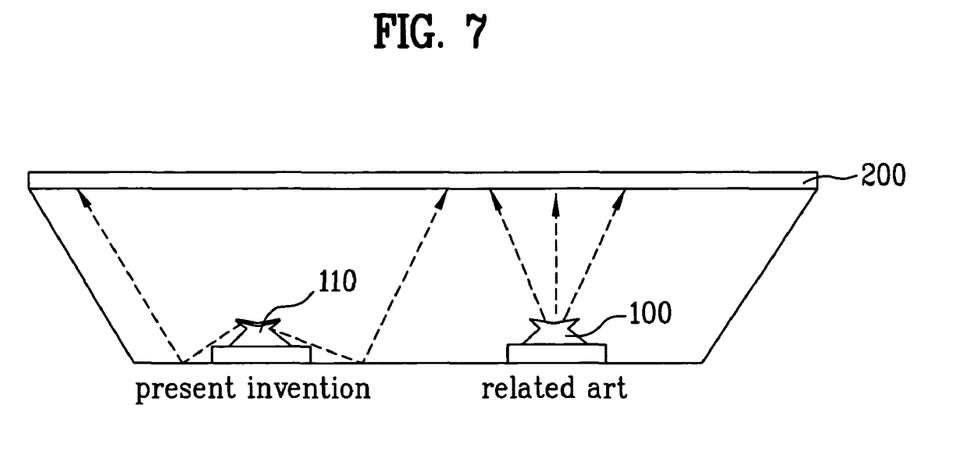
FIG. 7 is a cross-sectional view schematically illustrating a comparison of paths of lights emitted from respective LED lamps between the backlight unit of the present invention and the related art backlight unit.

FIG. 7 is a cross-sectional view schematically illustrating a comparison of paths of light emitted from respective LED lamps between the backlight unit of the present invention and the backlight unit of the related art. As shown in FIG. 7, in the related art, the light emitted in an upper direction from the LED lamp 100 is directly projected to the light dispersion member 200. By contrast, in the present invention, the light emitted from the LED lamp 100 is reflected in a lateral direction by the reflecting substance 1 10 formed on the upper surface of the LED lamp 100 and is then projected to the light dispersion member 200.

Figure 8A:
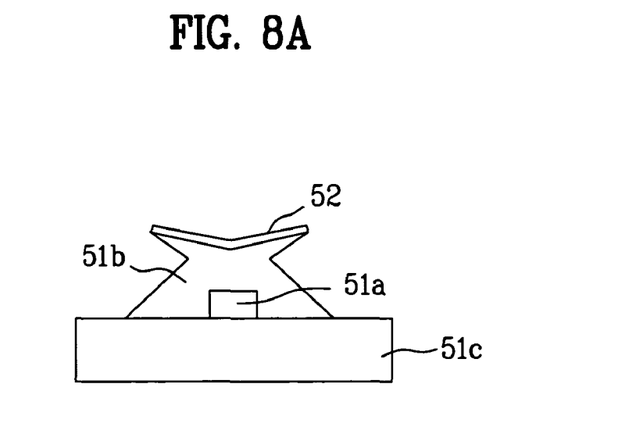
FIGS. 8A to 8C are cross-sectional views schematically illustrating LED lamps having reflective substances provided to a backlight unit of an LCD according to the present invention.
Figure 8B:
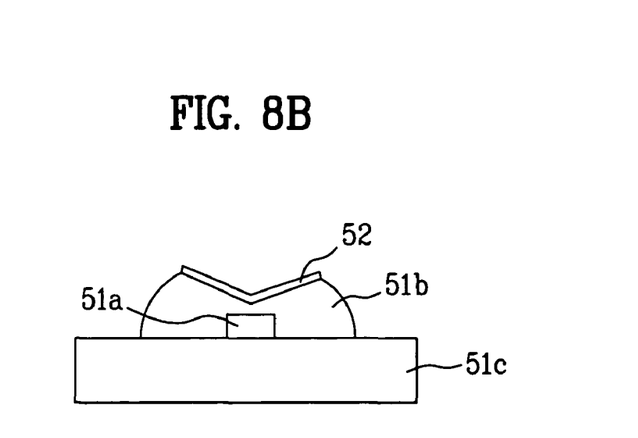
Figure 8C:
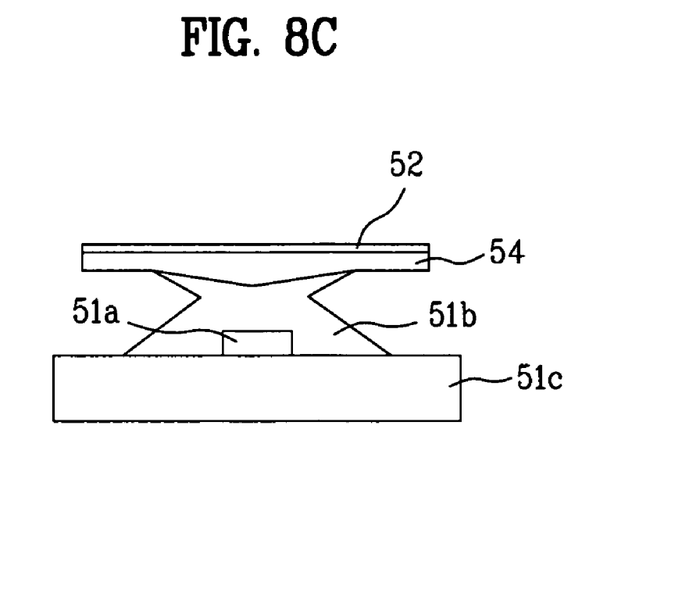

FIGS. 8A to 8C are cross-sectional views schematically illustrating LED lamps respectively having reflecting substances provided to a backlight unit of an LCD according to the present invention. As shown in FIG. 8A and FIG. 8B, an LED lamp 51 (of FIG. 5) includes an LED chip 51a emitting light, a lens 51b protecting the LED chip 51a and collecting the emitted light, a reflecting substance 52 formed on an upper surface of the lens 51b to reflect the light emitted from the LED chip 51a in a lateral direction, and a body 5lc supporting the LED chip 51a and the lens 51b. In this exemplary embodiment, the lens 51b may be configured to enclose the LED chip 51a and its surrounding, and the upper surface of the lens 51b may have a convex shape, a flat shape or a concave shape like 'V'. Thus, the reflecting substance 52 formed over the LED lamp 51a is coated on the upper surface of the lens 51b. Alternatively, the lens 51b may have one of various shapes including the above-explained shapes.

As shown in FIG. 8C, a transparent or semitransparent material 54 is attached to an upper part of the lens 51b. The reflecting substance 52 is coated on the transparent or semitransparent material 54. In this exemplary embodiment, the lens 51b may have one of various shapes including the above-explained shapes. Moreover, the transparent or semitransparent material 54 is primarily attached to the upper part of the lens 51b, thereby smoothly performing the color mixture of the light emitted from the LED chip 51a.

Figure 9:
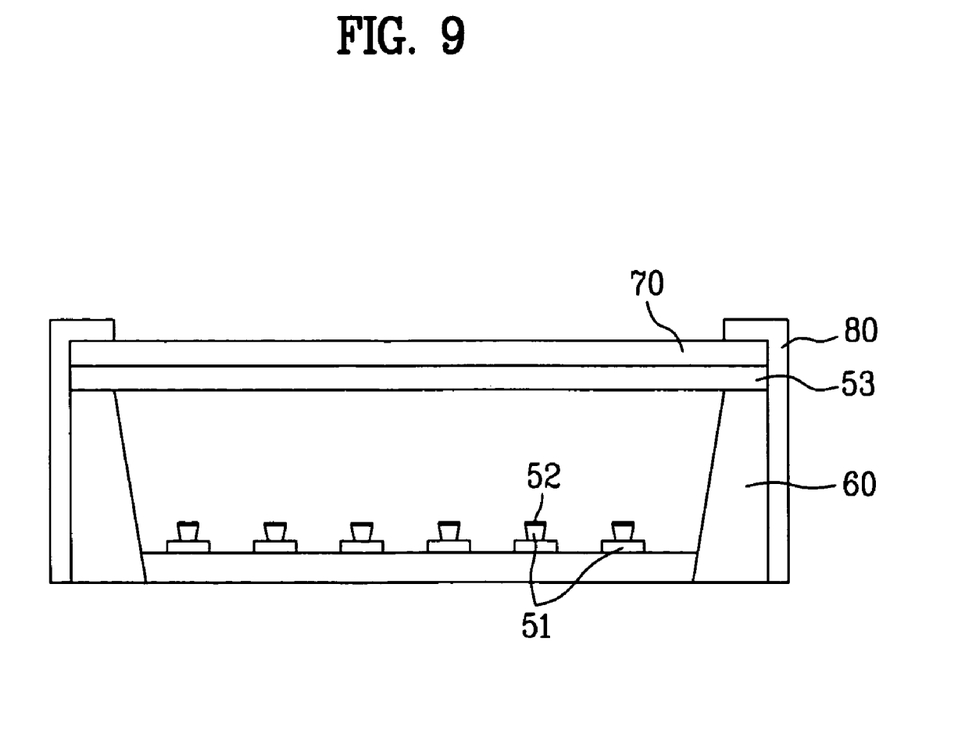
FIG. 9 is a cross-sectional view schematically illustrating an LCD device provided with the backlight unit of FIG. 5 according to the present invention.

FIG. 9 is a cross-sectional view schematically illustrating an LCD device provided with the backlight unit of FIG. 5. As shown in FIG. 9, the LCD device includes a plurality of LED lamps 51 sequentially and evenly arranged to emit R/G/B lights, respectively, a reflecting substance 52 formed on an upper surface of each of the LED lamps 51 to reflect the light emitted from the corresponding LED lamp 51 in a lateral direction, a light dispersion member 53 provided over the LED lamps 51 for diffusing to project the light reflected by the reflecting substance 52, an outer case 60 fixing the LED lamps 51 thereto and supporting the light dispersion member 53, an LCD panel 70 provided onto the light dispersion member 53 to display images by receiving the light via the light dispersion member 53, and a top case 80 provided to edges of the LCD panel 70 and lateral sides of the outer case 60 to fix the LCD panel 70 and the outer case 60 thereto.

When the LCD device displays an image on the LCD panel 70, the LED lamps 51 are lighted. A voltage is applied to a plurality of the LED lamps 51 entirely or selectively so that the corresponding LED lamps 51 can emit light. The lighted LED lamps 51 emit R/G/B lights, respectively. The light emitted from each of the LED lamps 51 is not projected straight but is reflected by the reflecting substance 52 formed on the upper surface of the corresponding LED lamp 51 in a lateral direction. Subsequently, the lights reflected in the lateral directions by the reflecting substances 52 produce a white light by the color mixture performed in a space between the light dispersion member 53 and the LED lamps 51. The white light is diffused by the light dispersion member 53 to be applied to a backside of the LCD panel 70, thereby displaying a specific image on the LCD panel 70.

Accordingly, the present invention provides the following effect. First of all, the backlight unit of the present invention can achieve a simple structure without employing the intermediate light guide panel of the related art. Second, by forming the reflecting substance on each LED lamp, the backlight unit of the present invention can prevent the LED lamp from being broken or deformed by the intermediate light guide panel due to heat, vibration, shock and the like. Finally, by reflecting light emitted from the LED lamps in the lateral directions, the present invention can improve color uniformity and color mixture.

It will be apparent to those skilled in the art that various modifications and variations can be made in the backlight unit and the liquid crystal display device using the same of the present invention without departing from the spirit or scope of the inventions. Thus, it is intended that the present invention covers the modifications and variations of this invention provided they come within the scope of the appended claims and their equivalents

What is claimed is:

1. A liquid crystal display (LCD) device, comprising:
a plurality of lamps sequentially and evenly arranged,
a first reflecting substance coated on an upper surface of each of the plurality of lamps to reflect light emitted from the each of the plurality of lamps in a lateral direction;
a light dispersion member provided over the plurality of lamps for diffusing to project the light reflected by the reflecting substance;
an outer case fixing the plurality of lamps thereto and supporting the light dispersion member;
an LCD panel provided onto the light dispersion member to display an image by receiving the light projected from the light dispersion member, wherein the LCD panel directly contacts to the light dispersion member;
a top case provided to edges of the LCD panel and lateral sides of the outer case to fix the LCD panel and the outer case thereto; and
a second reflecting substance formed on an inner surface of the outer case,
wherein each lamp includes an LED chip emitting light, a lens protecting the LED chip and collecting the emitted light, and a semitransparent material on an upper part of the lens, and wherein the first reflecting substance is formed on the semitransparent material.

2. The LCD device of claim 1, wherein the plurality of lamps are electroluminescent display (LED) lamps that emit R/G/B lights, respectively.

3. The LCD device of claim 1, wherein the first reflecting substance includes a white material selected from the group consisting of diffused reflection, mirror reflection and metal reflection.

4. The LCD device of claim 1, wherein each of the plurality of lamps includes:
a display chip emitting the light;
a lens protecting the display chip and collecting the emitted light; and a body supporting the display chip and the lens.

5. The LCD device of claim 1, wherein the display chip is an LED chip.

6. The LCD device of claim 4, wherein the first reflecting substance is formed on an upper surface of the lens.

7. The LCD device of claim 1, wherein the light dispersion member includes a plurality of diffusion sheets and diffusion plates to improve light dispersion effect.

* * * * *